Nov. 1, 1932.  C. W. SCHWARTZ  1,885,555
APPARATUS FOR TITLING MOVIE FILMS
Filed July 9, 1930  4 Sheets-Sheet 1

INVENTOR
Charles W. Schwartz
BY
Ramsey & Kent
his ATTORNEYS

Nov. 1, 1932.  C. W. SCHWARTZ  1,885,555
APPARATUS FOR TITLING MOVIE FILMS
Filed July 9, 1930  4 Sheets-Sheet 2

INVENTOR
Charles W. Schwartz
BY
Ramsey & Kent
his ATTORNEYS

Nov. 1, 1932.     C. W. SCHWARTZ     1,885,555
APPARATUS FOR TITLING MOVIE FILMS
Filed July 9, 1930     4 Sheets-Sheet 3

INVENTOR
Charles W. Schwartz
BY
Ramsey & Kent
his ATTORNEYS

Nov. 1, 1932.　　　C. W. SCHWARTZ　　　1,885,555
APPARATUS FOR TITLING MOVIE FILMS
Filed July 9, 1930　　　4 Sheets-Sheet 4

INVENTOR
Charles W. Schwartz
BY Ramsey & Kent
his ATTORNEYS

Patented Nov. 1, 1932

1,885,555

UNITED STATES PATENT OFFICE

CHARLES W. SCHWARTZ, OF NEW YORK, N. Y.

APPARATUS FOR TITLING MOVIE FILMS

Application filed July 9, 1930. Serial No. 466,773.

The present invention relates broadly to photography and more especially to titling devices for use with moving picture cameras.

The particular adaptation of the present invention herein disclosed is especially adapted for amateur hand moving picture cameras although it may be equally useful with professional standard cameras.

One of the difficulties in producing amateur moving pictures is to secure titles which may easily and properly be associated with particular scenes. Heretofore in the art, the custom has been to take the various scenes desired and then cut the film and introduce titles in the proper places. This is laborious and also usually results in waste of film, and frequently results in films being wrongly titled in the first instance.

The present invention comprises a device by means of which the desired title is photographed directly on the film at the scene being taken and then the particular scene to be associated with the title is photographed so that the resulting film is properly and fully titled when the film is developed. Another difficulty for the amateur in making titles is to be sure the title is properly placed on the film. To insure this being so, either special and usually expensive apparatus is required or special precautions must be taken to be sure the title is in focus and is properly placed and properly lighted. The present invention overcomes these difficulties by providing means whereby the title is automatically placed in the proper position and where non-focusing lenses are used, the title is automatically focused when the apparatus is in place.

The proper setting of the diaphragm for light conditions under which the film is to be exposed to take the scene renders the light conditions correct for titling when the camera is pointed in the direction of the scene which is to be photographed, thereby obviating the question of determining the light conditions for the title portion of the film.

Another feature of the present invention is the method whereby the operator may photograph the title against the scene to be later photographed. This results in a title in sharp focus upon a background slightly out of focus, so that when the film is finished and projected the title is set on an artistic background which fits the particular scene which later follows as a movie scene.

Other and further objects of the present invention will in part be obvious and will in part be pointed out hereinafter in the specification following by reference to the accompanying drawings, which illustrate the preferred embodiment of the invention. It is to be understood, however, that the disclosure herewith is to be considered as illustrative and not in the limiting sense.

The present invention comprises primarily a support attached to the camera and constructed to hold a title at a predetermined fixed distance in front of the camera lens, and to provide a correction lens, which when associated with the camera lens comprises a short focus lens system whereby the title is in sharp focus on the film, of the moving picture camera.

Preferably, the support comprises a substantially light tight box with the title on a transparent or semi-transparent support so that the light for photographing the title is transmitted through the medium on which the title is made. However, the device is adapted also to utilize non-transparent title supporting mediums whereby the title is photographed by light reflected directly from the title. Preferably, though not necessarily, the device is constructed to fold in the compact space for convenient carrying or transportation.

Figure 1:
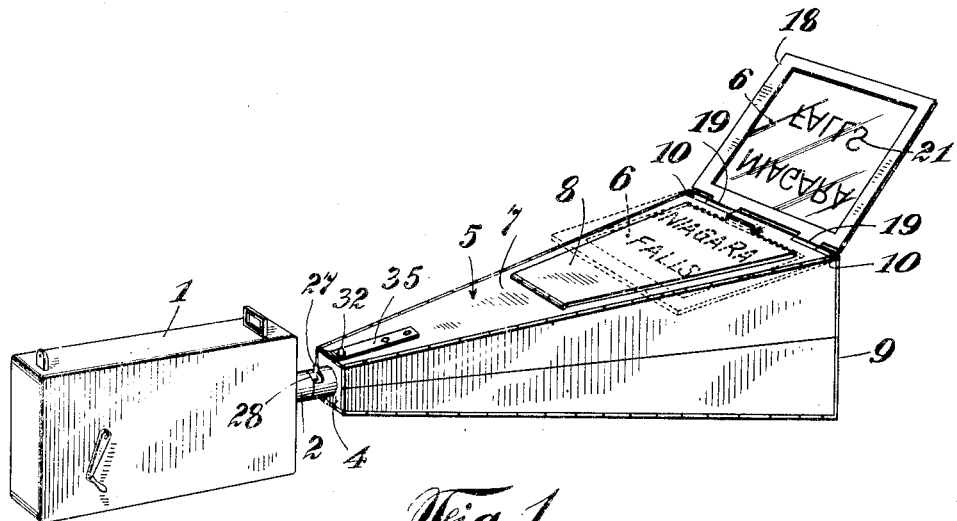
Fig. 1 illustrates the titling apparatus in position upon a moving picture camera.

The construction illustrated in Fig. 1 is a preferred embodiment of the invention and comprises a moving picture camera 1 provided with a lens tube 2, which supports a head 4 that carries a folding body 5 provided with a title screen 6. While the device is shown as being supported by the lens tube 2, it is to be understood that any other suitable attachment to the camera may be provided. Preferably, the upper member 7 of the folding body is provided with a substantially light tight trap door 8, which may be opened to permit light to fall upon the title when opaque titling material is supported in position on the end of the folding body so that the title may be photographed by reflected light.

Figure 2:
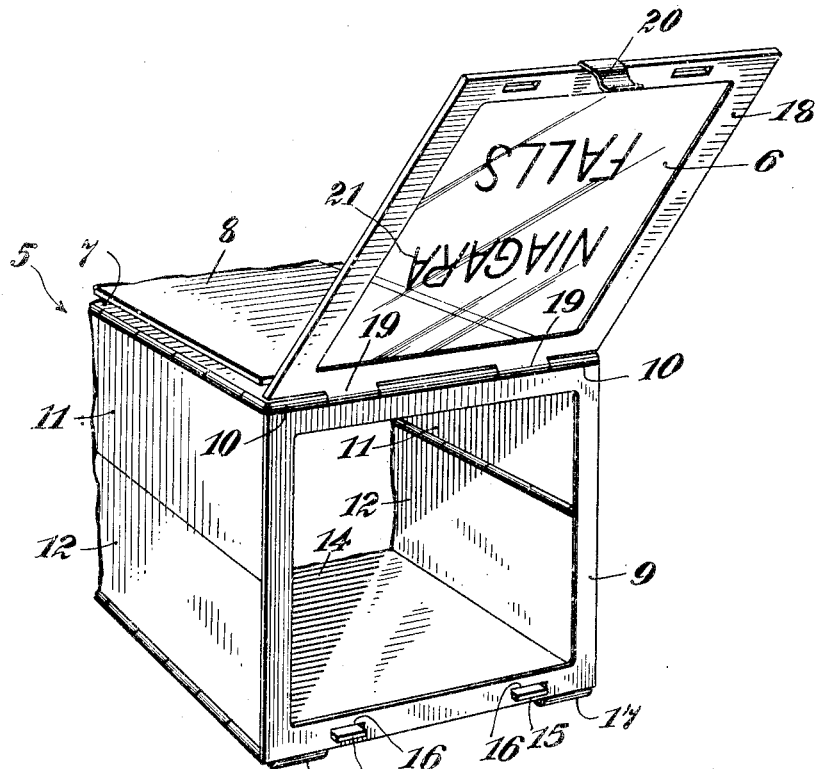
Fig. 2 is a perspective detail view of the front end of one form of the device.

Referring now more especially to Fig. 2, the preferred form of the invention comprises a supporting frame 9 provided with hinges 10 mounted on the upper member 7 of the folding body. Side plates 11 and 12 may be hinged to the upper member 7 and the lower member 14 of the folding body in such manner that the sides may be collapsed inwardly to fold the device and bring the upper member 7 closely adjacent to the lower member 14 for convenience in carrying the device. The lower member 14 may be provided with projections 15 which extend through slots 16 in the frame 9 to hold the side members 11 and 12 in extended position. Suitable friction roller catches 17 hold the supporting frame 9 in position when the device is extended for use. A titling frame 18 may also be provided with hinges 19 which secure this frame to the upper member 7 of the folding body. A latch 20 may be provided to hold this frame closed in place. This titling frame 18 may carry the plate or screen 6 which may be of glass or other material and may be frosted to form a semi-transparent surface or it may be clear glass or where desired, the glass may be omitted and paper, celluloid or other titling screens may be used. The titling frame 18 is adapted to be folded over on the top member as illustrated in dotted lines in Fig. 1 and then the title 21 may be placed on the titling plate. This title may be written in in pencil or may be formed by using gummed letters or any other manner to provide the suitable titling desired. Where glass is used, either clear or semi-transparent, a wax pencil may be utilized for writing the title.

Figure 3:
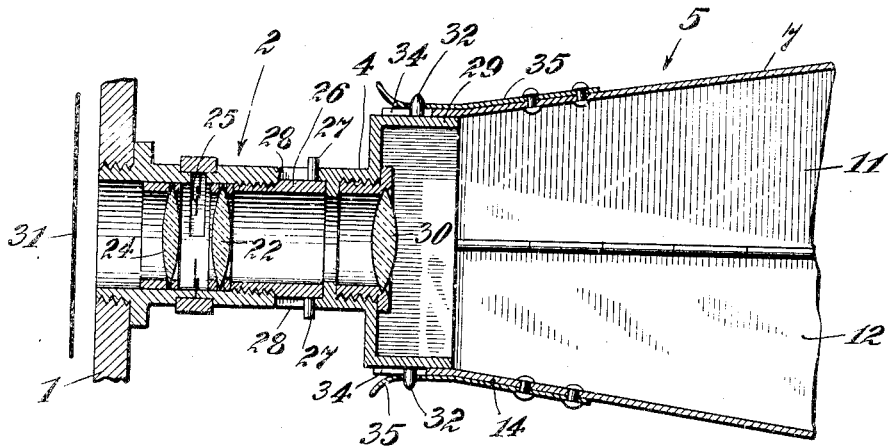
Fig. 3 is a sectional view through a camera lens and illustrates one construction by which the titling device may be attached to a camera.
Figure 4:
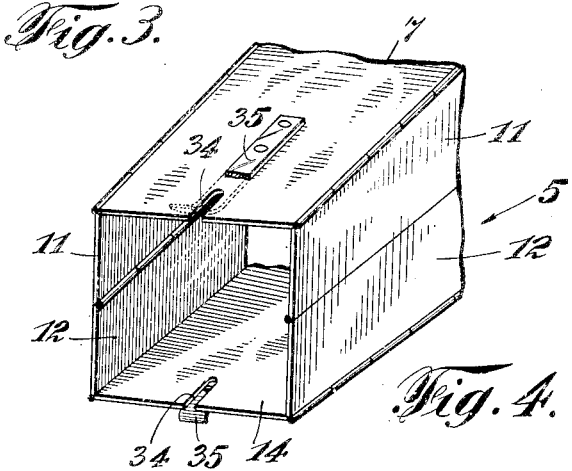
Fig. 4 is a perspective view of the camera end of the casing for a titling device.

Referring more especially to Fig. 3, the lens tube of a camera is provided with the usual camera lenses 22 and 24 and with the usual diaphragm 25. A convenient way of supporting the titling device comprises the insertion of a screw threaded tube 26 into the housing of the camera lens in the place of the sun shade commonly used with moving picture cameras. This tube 26 may be provided with pins 27 adapted to fit a bayonet joint slot 28 in the head 4 for the titling device. This head 4 preferably carries a correction lens 30, which renders the lens system short focus so that the title at the outer end of the device is in sharp focus on the film 31. Preferably, this head 4 is provided with pins 32 adapted to fit in the slots 34 in the top member 7 and the bottom member 14 of the folding body. Suitable spring clips 35 carried by the members 7 and 14 are constructed to snap over the pins 32 and lock the folding body 5 to the end piece 29 when the device is to be used.

Figure 5:
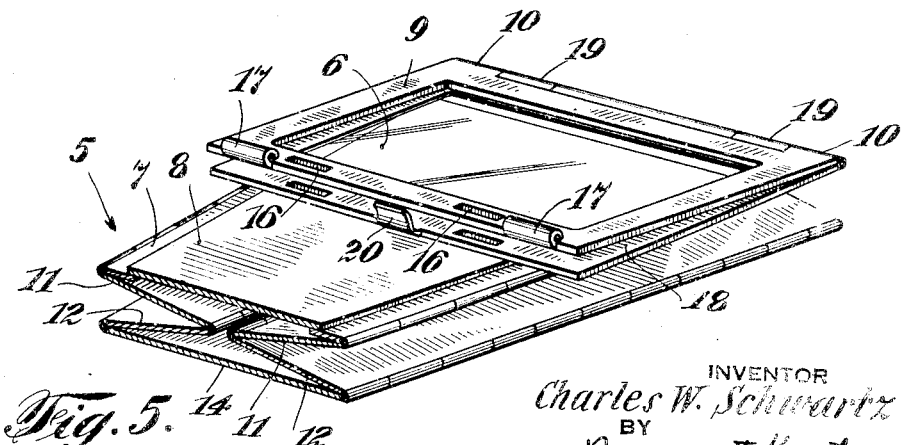
Fig. 5 illustrates the front end of the titling device when the device is folded.

When the device is not in use, the folding member is removed from the head 4, and the folding body is collapsed as illustrated in Fig. 5 with the supporting frame 9 and titling frame 18 folded back as illustrated in Fig. 5 to comprise a compact package. The head 4 carrying the correction lens 30 is removed from the screw tube 26 which now acts as a sun shade and the camera is ready for operation in the normal way.

Figure 6:
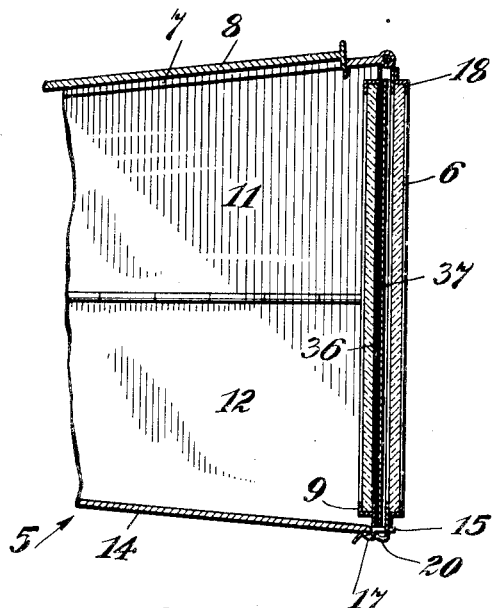
Fig. 6 illustrates a modification of a cross-section through the titling end of the device.

Fig. 6 illustrates a construction in which a plate 36 of glass or other transparent material is mounted on the supporting frame 9, so that a paper or other flexible title card 37 is securely held in position between the plate or screen 6 which may be carried by the title frame 18 and the plate 36 on the frame 9. It is to be understood, however, that the present invention contemplates the omission of both glass plates, as is illustrated in Fig. 6, so that a sufficiently stable transparent titling card such as the card 37 may be set between the two frames 9 and 18.

Figure 7:
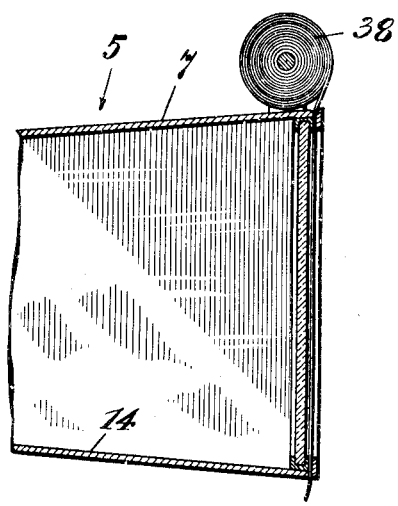
Fig. 7 is a diagrammatic cross-sectional view through the front end of a further modification of the device.
Figure 8:
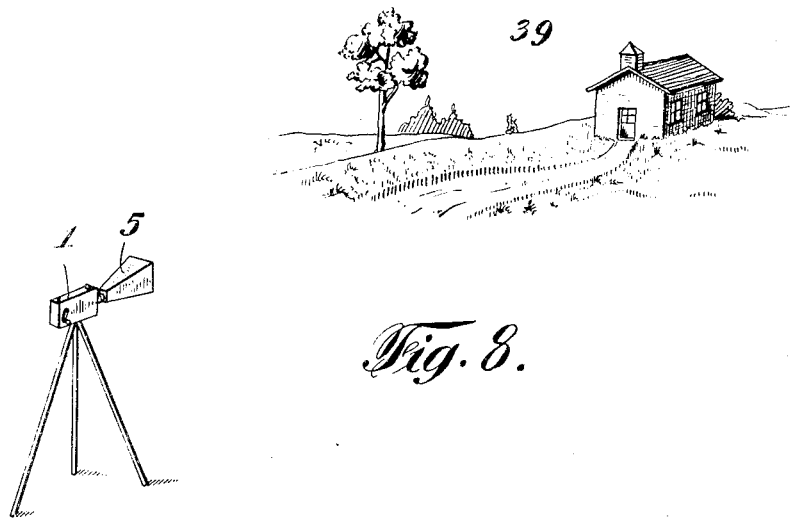
Fig. 8 illustrates the method of making titles in accordance with the present inventions.
Figure 9:
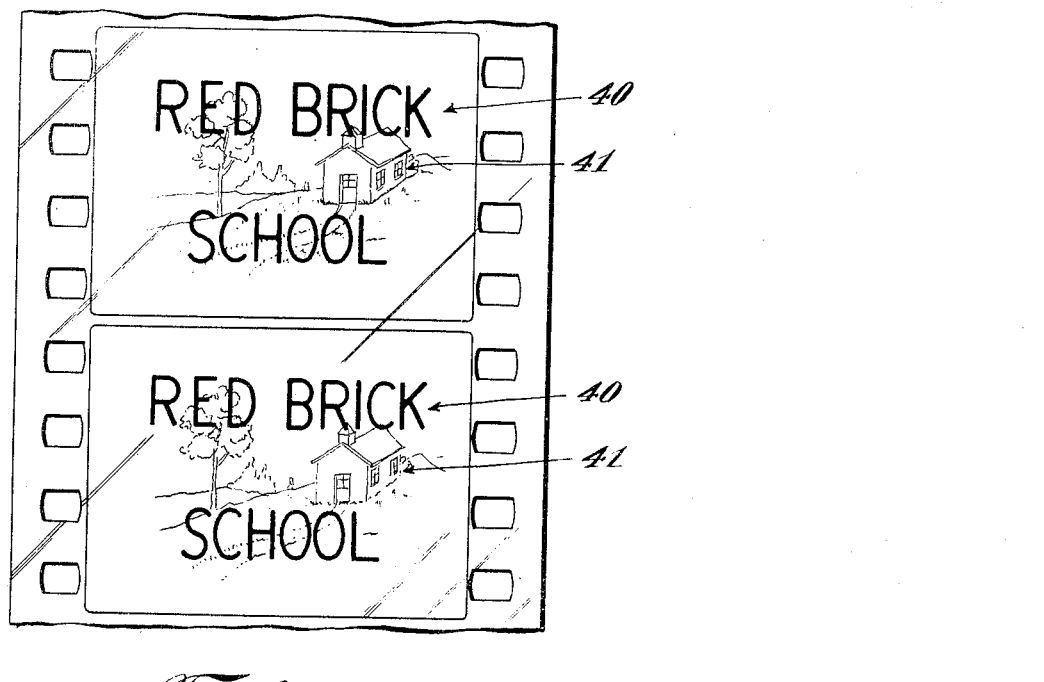
Fig. 9 illustrates a section of moving picture film made according to Fig. 8.

Fig. 7 illustrates more or less diagrammatically a construction in which a suitable roll of paper 38 or other material is carried by the device in such manner as to be guided across the end of the body to permit titles to be written on sections of the paper which may be pulled up and destroyed when desired, thereby presenting a fresh portion of the paper for another title.

Where transparent supports are provided on which titles may be written, for example, glass or celluloid or other material, the title is written in a suitable way and then the camera may be directed towards a scene 39 (Fig. 8) which scene will appear on the screen as soft focus but sufficiently clear to suggest the general outline of the scene. The resultant film when developed and printed, or reversed as is common in the art, will appear as shown in Fig. 9 with the title 40 in sharp focus and with the image 41 of the scene 39 out of focus as a background. The method forms a very convenient way of producing artistic titles, which are related to the scene later to be photographed as a moving picture incident.

In view of the fact that the titles are photographed under lighting conditions for which the diaphragm 25 has been set to take a movie scene, the diaphragm setting for photographing titles is correct so that conditions are automatically determined without special consideration for the making of the titles.

It is to be understood that where the camera is provided with a focusing lens which may be focused on the title, the correction lens may be omitted.

While the present invention is more particularly adapted for hand movie cameras, it is to be understood that it is not so limited but may be utilized with any type of moving picture camera. It is also to be understood that the supports for the titles may be open in such a manner as to admit light to the titling plate although the substantially light tight body is preferred because there is then no danger of reflected light interfering in the correct exposure on the title.

Figure 10:
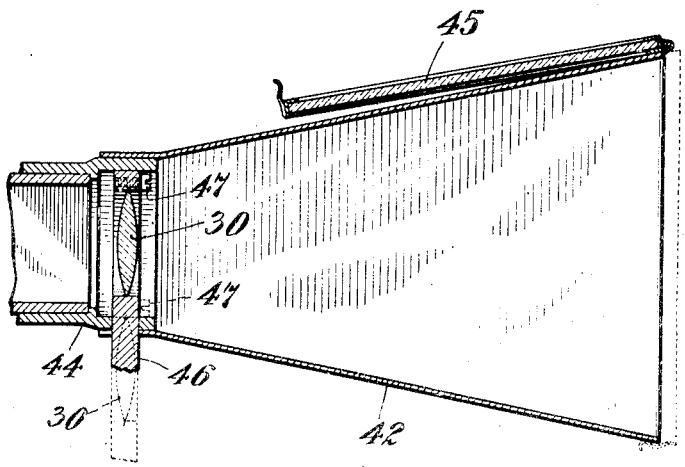
Fig. 10 is a modification of the mounting for the correction lens.

Fig. 10 illustrates a slight modification wherein a short tubular body 42, which may be non-collapsible or collapsible if desired, is mounted on a head 44 and carries the title screen 45. The correction lens 30 is mounted in such manner as to be placed in or removed from the field of the camera lens, as for example, in a slidable plate 46 slidable in a slot in the head 44 so that the slide 46 may be withdrawn to dotted line position (Fig. 10) wherein the stop screw 47 prevents the plate from dropping out. When in the withdrawn position, the correction lens 30 and all parts of the plate 46 are entirely outside of the field of the camera lens, and the title screen 45 is swung to the upper position as indicated in Fig. 10, leaving the body 42 open to act as a sun shade for the camera lens. When the slide 46 is in the raised position, as indicated in full lines in Fig. 10, the title screen is dropped into dotted line position and is in focus on the film for photographing titles.

Having described my invention, I claim:—

1. A titling device for moving picture cameras comprising a collapsible body, a removable head for one end of said collapsible body to hold the same in extended position when in place, means to secure said head to a moving picture camera lens tube, means on the outer end of said body to hold said body in extended position, and a title screen supported by and mounted on the outer end of said body.

2. A titling device for moving picture cameras comprising a tubular body with hinged side portions whereby said tubular body may be collapsed for carrying, hinged means to retain said tubular body in extended position when said device is in use, a correction lens within said body, means to support a title screen at the outer end of said body, and means to attach said body to a moving picture camera over the camera lens.

3. A titling device for moving picture cameras comprising a support having closed side walls, means to attach said support to a moving picture camera, a transparent title screen carried by said support, and a correction lens carried by said support and adapted to focus said title screen through the camera lens on to a film in the camera, said title screen being hingedly secured to said support to be moved into and out of position to substantially close and open one end of the support.

4. A titling device for moving picture films comprising in combination, a moving picture camera, a substantially light tight tubular body extending in front of the camera lens, means to attach one end of said body to said moving picture camera over the camera lens, means to support a title screen and a holder therefor at the other end of said body, and a correction lens to focus said title screen through the camera lens on to a film located in the normal focus of said camera lens, said title screen holder being hingedly secured to said support to cause said holder and said title screen to be movable into and out of position to substantially close and open one end of the support.

5. A titling device for moving picture cameras comprising in combination, a camera lens, a substantially light tight tube mounted over said camera lens, a correction lens cooperating with the camera lens to change the lens system into a short focus, said correction lens being mounted in one end of said tube in such manner as to be removable from the field of the camera lens, a title screen and holder therefor on the other end of said tube substantially completely closing the end of the tube, and means whereby said screen holder and screen may be moved from normal position over the end of said tube whereby said tube comprises a sun shade for said camera lens when the correction lens is displaced from the field of the camera lens.

6. A titling device for moving picture cameras comprising a collapsible substantially light tight tubular body, a lens holder removably mounted at one end of said body to hold said body expanded when in place, a correction lens mounted in said lens holder, a title screen holder at the other end of said holder, and a transparent title screen positioned within said holder, said holder being hingedly secured to said body to cause the holder and the title screen to be movable into and out of position to substantially completely close and open the end of said body when the body is expanded.

7. A titling device for moving picture cameras comprising a tubular body member adapted to be attached to a moving picture camera to comprise a sun shade for the camera lens, a title screen carried by said body member, a correction lens carried by said body member, means whereby said correction lens may be placed in and removed from the field of said camera lens while the body member is attached to the camera, and means for removing said title screen from the field of said camera lens with the said body attached to the camera.

CHARLES W. SCHWARTZ.